TEMPERATURE STABILIZED NON-LINEAR REACTANCE ELEMENTS AND CIRCUITS

Filed Dec. 21, 1959

INVENTOR
ROLF W. LANDAUER

BY John E. Dougherty, Jr.
ATTORNEY 3,065,402
Patented Nov. 20, 1962

3,065,402

TEMPERATURE STABILIZED NON-LINEAR REACTANCE ELEMENTS AND CIRCUITS

Rolf W. Landauer, Poughkeepsie, N.Y., assignor to International Business Machines Corporation, New York, N.Y., a corporation of New York Filed Dec. 21, 1959, Ser. No. 861,103
13 Claims. (Cl. 323—69)

The present invention relates to non-linear circuits and, more particularly, to circuits of this type which include a non-linear element that is heated by hysteresis heating to maintain it stably at a temperature at which it exhibits a high degree of non-linear reactance.

Non-linear reactance circuits may be broadly classified to include all circuits which employ one or more elements whose reactance is varied non-linearly in response to control signals applied to the elements. Circuits of this general type include dielectric and magnetic amplifiers, parametric amplifiers and oscillators, and a large number of the circuits using solid state elements which are used to perform switching, memory, and logical functions in data handling systems. In many, if not most non-linear reactance circuits, it is preferable that the non-linear characteristics be as pronounced as possible and, for this reason, many such circuits have been operated with the non-linear elements maintained at a particular temperature at which they exhibit a high degree of non-linearity. However, the non-linear characteristics of many such elements, when maintained at these particular temperatures, are also extremely temperature sensitive and, therefore, it becomes necessary to provide very sensitive temperature control on the equipment which maintains the element at the proper temperature.

In accordance with the principles of the present invention, a non-linear reactance element, which exhibits a pronounced degree of non-linearity at an elevated temperature, is placed in an environment at a temperature below this elevated temperature and is raised to the elevated temperature and maintained stably at the elevated temperature by hysteresis heating. More specifically, in the illustrative embodiment of the invention disclosed herein, a ferroelectric capacitor is employed as a non-linear reactance element. The dielectric of the capacitor is a ferroelectric material which undergoes a second order transition at its Curie temperature, which is the temperature at which it undergoes a transition from the ferroelectric to the paraelectric state. The capacitor dielectric exhibits a high degree of non-linear capacitance at temperatures near its Curie temperature. The capacitor is placed in an environment at a temperature below its Curie temperature and a signal is applied to the capacitor which produces hysteresis heating in the dielectric of the capacitor. This heating raises the temperature of the capacitor towards the Curie point for the ferroelectric material. As the temperature is raised, the hysteresis loop for the material shrinks and, therefore, the amount of heat produced by the hysteresis heating is reduced. This process continues until an equilibrium condition is reached between the input hysteresis heating and the output heat dissipation to the surroundings of the capacitor at a temperature which is immediately below the Curie temperature for the ferroelectric material. If the temperature of the environment of the capacitor decreases, the hysteresis loop is enlarged thereby producing a sufficient increase in hysteresis heating to cause the capacitor to remain stably at the operating temperature. Similarly, any increase in the temperature of the capacitor environment causes shrinking of the hysteresis loop for the capacitor, even to zero at its Curie temperature, so that the capacitor remains stably at its operating temperature. Thus, the capacitor reacts by the changes in the size of its hysteresis loop to produce just sufficient hysteresis heating to maintain it stably at a desired operating temperature.

It is, therefore, an object of the present invention to provide improved non-linear reactance circuits.

Another object is to provide an improved method of maintaining the temperature of the non-linear reactance element stably at a temperature at which it exhibts a high degree of non-linear reactance.

Still another object is to provide improved non-linear reactance circuits which include a non-linear reactance element to which a signal is applied that is effective both as an electrical input to the non-linear circuit and as a means for producing hysteresis heating in the non-linear element to maintain it at an operating temperature at which it exhibits a very high degree of non-linear reactance.

Still another object is to provide a circuit of the above described type using, as a non-linear element, a ferroelectric capacitor having, as a dielectric, a ferroelectric material which undergoes a second order transition at its Curie temperature.

The foregoing and other objects, features and advantages of the invention will be apparent from the following more particular description of preferred embodiments of the invention, as illustrated in the accompanying drawings.

Figure 1:
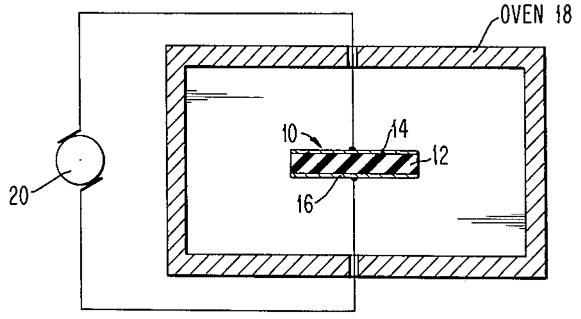
FIG. 1 is a diagrammatic illustration of a ferroelectric capacitor placed within an oven and connected to a signal source for providing hysteresis heating of the capacitor.

In the diagrammatic illustration of FIG. 1, the numeral 10 generally designates a ferroelectric capacitor, formed of a body of ferroelectric material, on opposite surfaces of which are deposited a pair of electrodes 14 and 16. This capacitor is mounted in an oven 18. A pair of leads extend from the electrodes 14 and 16 of the capacitor to the terminals of a generator 20. The material forming the capacitor dielectric 12 is a single crystal of tri-glycine sulfate. This material is ferroelectric and has a Curie temperature of 49.8° C. Below this temperature, the tri-glycine sulfate crystal exhibits ferroelectric properties and above this temperature the crystal is paraelectric. The transition from the ferroelectric to the paraelectric state, which the tri-glycine sulfate crystal undergoes at a temperature of 49.8° C., is a second order transition, that is, it is not an abrupt transition. Thus, the hysteresis loop for the tri-glycine sulfate crystal, which is a characteristic property of the ferroelectric state, does not remain unchanged as the temperature of the crystal is increased toward the Curie temperature for the crystal and then abruptly disappear when this temperature is attained. Rather, as the temperature of the crystal is raised, the hysteresis loop for the crystal becomes smaller and smaller until, at the Curie temperature 49.8° C., the hysteresis characteristic disappears altogether and the material becomes paraelectric.

Ferroelectric capacitors such as the tri-glycine sulfate capacitor of FIG. 1 exhibits non-linear reactance. More specifically, the capactive reactance which a capacitor of this type presents to an applied signal can be varied by applying biasing or modulating signals to the capacitor. Further, this non-linearity is most pronounced near the Curie temperature for the ferroelectric dielectric of the capacitor. Therefore, it is advisable in circuits which employ a ferroelectric capacitor as a non-linear capacitor, that the ferroelectric material be maintained at a temperature near its Curie temperature. However, the non-linear characteristics of these capacitors, though they are most pronounced near their Curie temperatures, are also extremely temperature sensitive at these temperatures.

In the diagrammatic illustration of FIG. 1, the oven 18 is operable to maintain the crystal 12, which forms the dielectric of capacitor 10, at a temperature some 5 degrees below the Curie temperature for the crystal, that is, about 45° C. The generator 20 applies alternating signals of sufficient magnitude to cause the hysteresis loop for the crystal to be traversed. This traversal of the hysteresis loop produces hysteresis heating of the crystal, thereby causing the temperature of the crystal to be raised. When the temperature of the crystal is raised, its hysteresis loop shrinks. As the hysteresis loop shrinks, the amount of heating produced by the hysteresis loop traversals diminishes. The frequency and magnitude of the signals supplied by the generator 20 are so related to the hysteresis heating produced in crystal 12 and the rate at which this heat is transferred to the environs of oven 18 that the crystal continues to be raised in temperature until it reaches a temperature just below its Curie temperature. At this temperature, the hysteresis loop is extremely small and the device reaches an equilibrium state at which the amount of heat produced in the crystal by the hysteresis heating just balances the heat transporated from the crystal to its surroundings. The crystal remains stable at this temperature even if the temperature of the oven changes. If there is a change in oven temperature such that the crystal is momentarily heated above its Curie temperature, the hysteresis loop for the crystal disappears. The crystal temperature immediately reverts towards the temperature of the oven until its temperature is reduced below its Curie point and again exhibits a hysteresis characteristic. The crystal then stabilizes the temperature at which the hysteresis heating balances the heat dissipation to the surroundings. Similarly, if the temperature of the crystal environment is, for any reason lowered, the hysteresis loop becomes larger, thereby increasing the hysteresis heating so that the temperature of the crystal is raised again to the stable temperature at which the hysteresis loop is smaller and a balance between the hysteresis heating and heat dissipation to the surroundings is achieved. For the illustrative structure and mode of operation shown, wherein the tri-glycine sulfate crystal is placed in an oven at a temperature 5 degrees below the crystal's Curie temperature, an applied signal having a frequency of $5\times10^{8}$ cycles per second maintains the crystal at a temperature about .010° C., below the crystal's Curie temperature. If the oven temperature changes by 1° C., the crystal stabilizes at a temperature less than .001° C. removed from its original temperature.

A ferroelectric capacitor, such as that shown in FIG. 1, which is maintained stably just below the Curie temperature for the ferroelectric dielectric at which temperature the non-linear capacitance is most pronounced, may be advantageously employed in a large number of circuits which require for their operation non-linear reactance elements. In such circuits, it is desirable not only that a high degree of non-linearity be obtained but that this amount of non-linearity remains essentially unchanged. A ferroelectric capacitor maintained at its Curie temperature, as described above, has both of these characteristics.

Figure 2:
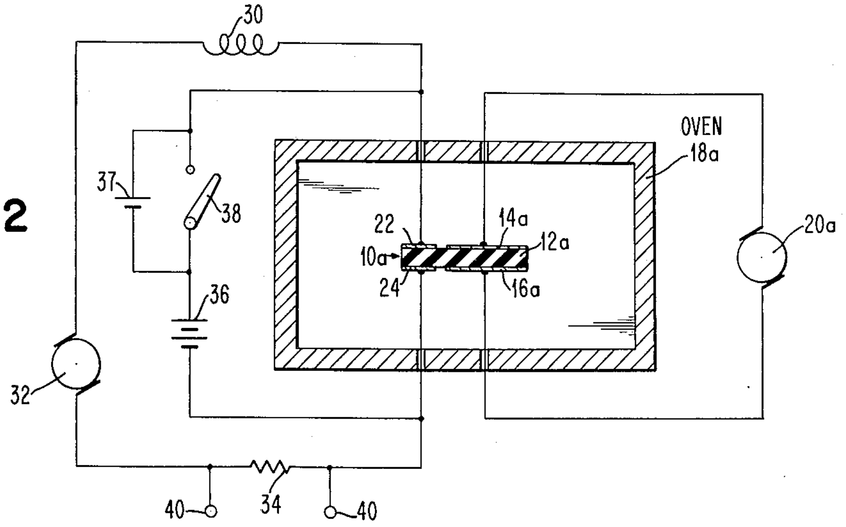
FIGS. 2 and 3 are two embodiments of dielectric amplifiers each including a ferroelectric capacitor maintained stably at an operating temperature near its Curie temperature by hysteresis heating in the ferroelectric dielectric of the capacitor.
Figure 3:
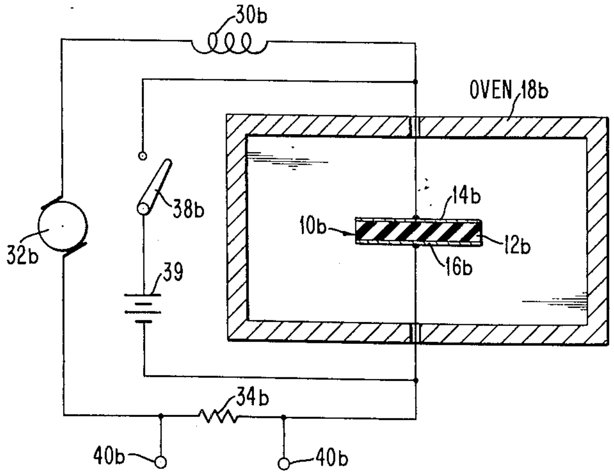

FIGS. 2 and 3 show two embodiments of dielectric amplifiers using tri-glycine sulfate capacitors maintained at temperatures just below their Curie temperature by hysteresis heating. In FIG. 2, the tri-glycine sulfate crystal, which forms the dielectric of a non-linear capacitor, is designated 12*a*. This crystal is provided with a first pair of electrodes 14*a* and 16*a* from which a pair of leads extend to the terminals of generator 20*a*. The capacitor 10*a* is mounted in an oven 18*a* which is maintained at a temperature of 45° C., that is some 5° below the Curie temperature for the tri-glycine sulfate crystal. The electrodes 14*a* and 16*a* cover a large portion of the surface of the tri-glycine sulfate crystal 12*a*, and the greater part of this crystal forms a dielectric between this pair of electrodes. Another pair of electrodes 22 and 24 are provided on the crystal. These electrodes are connected in a circuit including an inductance 30, a signal generator 32, and a load resistor 34. There is also connected across the electrodes 22 and 24 a biasing and control circuit which includes a pair of batteries 36 and 37 and a switch connected across the latter battery illustratively represented at 38.

The tri-glycine sulfate crystal 12*a* of the capacitor 10*a* is raised from the temperature of the oven 18*a* to just below the Curie temperature for the tri-glycine sulfate by hysteresis heating in the crystalline material produced by an alternating signal applied by generator 20*a*. This signal causes the portion of the crystal between electrodes 14*a* and 16*a* to repeatedly traverse its hysteresis loop to thereby heat the crystal until a stable operating temperature just below the Curie point for the crystal is attained. The hysteresis heating in this portion of the crystal propagates to the portion of the crystal between electrodes 22 and 24 so that the entire crystal remains essentially at the same temperature and, therefore, the portion of the capacitor 10*a*, formed by the electrodes 22 and 24 and the portion of the tri-glycine sulfate therebetween, exhibits pronounced non-linearity.

The capacitance presented by the capacitor to the signal voltage of generator 32 can be varied by operating the switch 38. When this switch is open, the capacitor is biased by the combined voltages of the series connected batteries 36 and 37. The combined voltage of these two batteries is sufficient to bias the capacitor to a point at which it exhibits a relatively low capacitance. When the switch is closed to reduce the bias voltage applied to the capacitor to the voltage of battery 36 alone, the capacitance of the capacitor is raised. Since the non-linearity of the capacitor is pronounced at this operating temperature, relatively small signals, in the form of the voltages applied by battery 37 under control of switch 38, are effective to produce rather large changes in the capacitance presented by the capacitor 10*a* to the generator 32. The inductance 30 and this capacitor are connected to form a circuit which may be resonant at either the high or low value of the capacitance. Consider the case wherein the circuit is resonant at the high value of capacitance which is presented by the capacitor 10*a*, that is, when the switch 38 is closed. In such a case, the signal from the generator 32 produces an appreciable current through a load resistance 34 and, therefore, an appreciable output voltage is manifested between the output terminals 40. However, when the switch 38 is opened to lower the capacitance of capacitor 10*a*, the resonant circuit is detuned and little or no voltage signal is manifested between these output terminals.

It is, of course, obvious that the circuit may be operated as indicated above to produce a large voltage output at terminal 40 only when the switch 38 is opened. Further, it is not necessary that this circuit be operated only as an on-off modulator. For example, the battery 37 and switch 38 might be replaced by a controllable A.C. generator so that the signals produced by this generator modulate the signals produced by generator 32 with the modulated signal outputs being manifested at the terminals 40.

The dielectric amplifier of FIG. 3 is similar to that shown in FIG. 2. However, the circuit of FIG. 3 differs from that of FIG. 2 in that the signals from a signal generator 32*b*, which is connected in the resonant circuit including the capacitor, are effective to produce the hysteresis heating required to maintain the temperature of the capacitor immediately below the temperature of the tri-glycine dielectric. Further, in the circuit of FIG. 3 only a single voltage source, designated 39, is connected in the bias and control circuit. As in the other embodiments, an oven 18a maintains the tri-glycine crystal at a temperature a few degrees below its Curie temperature. In the circuit of FIG. 3 it is preferable that the resonant circuit formed by the capacitor and the inductance 30b be tuned when the switch 38b is open. This switch is operated intermittently to control the production of outputs across a load resistor 34b, which outputs are manifested between a pair of terminals 40b. In accordance with this mode of operation, when switch 38b remains open, there is no bias voltage applied to the capacitor 10b and its capacitance remains high so that a significant voltage output is produced between the terminals 40b. However, when this switch is operated, that is, when it is closed and then opened, during the time that it is closed, the capacitance of capacitor 10b is lowered by the voltage applied by battery 39. The circuit is then detuned and the output across terminals 40b is reduced to essentially zero. When operated in this preferred mode, the circuit of FIG. 3 may be considered as an on-off type gate for gating A.C. signals from a source 32b to an output at terminals 40b. When the gate is in its normal condition, signals are transmitted from the generator 32b to the terminals 40b, but the transmission of signals to the output terminals may be selectively interrupted by operating switch 38b.

While the invention has been particularly shown and described with reference to preferred embodiments thereof, it will be understood by those skilled in the art that various changes in form and details may be made therein without departing from the spirit and scope of the invention.

What is claimed is:

1. In a non-linear capacitance circuit; a capacitor formed of a pair of electrodes separated by a body of dielectric material; said dielectric material comprising a ferroelectric material which undergoes a second order transition at the Curie temperature for the material and which exhibits a high degree of non-linear capacitance at temperatures near its Curie temperature; an oven for maintaining the temperature of said ferroelectric material at a temperature below its Curie temperature; and a signal source coupled to the electrodes of said capacitor applying an A.C. signal thereto effective to produce hysteresis heating of the ferroelectric dielectric sufficient to raise the temperature thereof to a temperature immediately below its Curie temperature and maintain it stably at the raised temperature.

2. The circuit of claim 1 wherein said dielectric consists of a single crystal of tri-glycine sulfate.

3. In a non-linear capacitance circuit; a capacitor formed of a pair of electrodes separated by a body of dielectric material; said dielectric material comprising a ferroelectric material which undergoes a second order transition at the Curie temperature for the material and which exhibits a high degree of non-linearity at temperatures near its Curie temperature; and a signal source coupled to the electrodes of said capacitor applying thereto signals effective to produce sufficient hysteresis heating in the ferroelectric dielectric to raise the temperature thereof to a predetermined temperature immediately below its Curie temperature before the amount of heat dissipated to the surroundings of the capacitor balances the hysteresis heating of the ferroelectric dielectric; whereby said ferroelectric dielectric is maintained stably at said predetermined temperature immediately below its Curie temperature.

4. In a non-linear capacitance circuit; a capacitor formed of a pair of electrodes separated by a body of dielectric material; said dielectric material comprising a ferroelectric material which undergoes a second order transition at the Curie temperature for the material and which exhibits a high degree of non-linearity at temperatures near its Curie temperature; said ferroelectric capacitor being mounted in an environment at a first temperature removed from the Curie temperature of the ferroelectric material; and a signal source coupled to the electrodes of said capacitor applying an A.C. signal thereto effective to produce hysteresis heating of the ferroelectric material sufficient to raise the temperature thereof to a second temperature and maintain it stably at said second temperature at which said capacitor exhibits a higher degree of non-linearity than at said first temperature.

5. In a non-linear reactance circuit; an element having a non-linear reactance characteristic; said element having a Curie temperature and exhibiting a hysteresis characteristic when maintained at a temperature below said Curie temperature and undergoing a second order transition at said Curie temperature; said element being mounted in an environment at a first temperature below said Curie temperature; and a signal source coupled to said element for applying thereto signals effective to produce hysteresis heating of the element sufficient to raise the temperature thereof to a second temperature at which the heat dissipated by said element to its environment balances the hysteresis heating of the element; the degree of non-linearity exhibited by said element being greater at said second temperature than at said first temperature.

6. The circuit of claim 5 wherein said element is connected with another reactance element in a resonant circuit.

7. The circuit of claim 5 wherein said element is a capacitor having as a dielectric a single crystal of tri-glycine sulfate.

8. In a non-linear reactance circuit; an element which exhibits a hysteresis loop which becomes smaller as the temperature of the element is raised and which disappears entirely at a predetermined temperature for the element; said element exhibiting a high degree of non-linear reactance at temperatures near said predetermined temperature; means applying to said element a signal having a magnitude and frequency to produce sufficient hysteresis heating of said element to cause the temperature thereof to be raised until the element reaches an equilibrium condition at a temperature immediately below said predetermined Curie temperature for the element; whereby said element is maintained stably at said temperature immediately below said predetermined temperature at which it exhibits a high degree of non-linear reactance.

9. The circuit of claim 8 wherein said element is connected in a resonant circuit; and output means are connected to said circuit for producing outputs in response to said signals applied to said element.

10. The circuit of claim 8 wherein said element is a capacitor having as a dielectric a single crystal of tri-glycine sulfate.

11. The circuit of claim 10 wherein said circuit is a dielectric amplifier circuit and includes means for applying biasing signals to said tri-glycine sulfate capacitor to vary the capacitance presented by said capacitor to signals applied by said signal source to said capacitor; and means coupled to said capacitor for producing outputs in response to said signals applied by said signal source under the control of biasing signals applied to said capacitor by said biasing means.

12. The method of maintaining a capacitor having, as a dielectric, a ferroelectric material which undergoes a second order transition at its Curie temperature stably at a temperature at which the capacitor exhibits a high degree of non-linear capacitance comprising the steps of: maintaining the capacitor in an environment having a temperature below the Curie temperature for the ferroelectric material; and applying to the capacitor an alternating signal effective to produce sufficient hysteresis heating in the ferroelectric material to cause the temperature of the material to be raised to a temperature immediately below the Curie temperature for the ferroelectric material at which an equilibrium condition is reached between the hysteresis heating produced by the applied signals and the heat dissipated by the material to the environment.

13. The method of maintaining an element, which has a hysteresis loop at a temperature below a Curie temperature for the element and which undergoes a second order transition at its Curie temperature, stably at a temperature at which the element exhibits a high degree of non-linear reactance comprising the steps of: maintaining the element in an environment having a temperature below the Curie temperature for the element; and applying to the element a signal effective to produce sufficient hysteresis heating in the element to cause the temperature of the element to be raised to a temperature immediately below the Curie temperature for the element at which an equilibrium condition is reached between the hysteresis heating produced by the applied signal and the heat dissipated by the element to its environment.

References Cited in the file of this patent

UNITED STATES PATENTS

| | | |
|---|---|---|
| 1,655,847 | Siebs | Jan. 10, 1928 |
| 2,825,868 | Olsen | Mar. 4, 1958 |